United States Patent
Ito et al.

(10) Patent No.: US 7,898,793 B2
(45) Date of Patent: Mar. 1, 2011

(54) LAMINATED CERAMIC CAPACITOR

(75) Inventors: Kazushige Ito, Tokyo (JP); Haruya Hara, Tokyo (JP); Toshihiro Iguchi, Tokyo (JP); Shigeki Sato, Tokyo (JP); Akira Sato, Tokyo (JP); Takashi Kojima, Tokyo (JP)

(73) Assignee: TDK Corporation, Tokyo (JP)

( * ) Notice: Subject to any disclaimer, the term of this patent is extended or adjusted under 35 U.S.C. 154(b) by 533 days.

(21) Appl. No.: 10/593,342

(22) PCT Filed: Feb. 23, 2005

(86) PCT No.: PCT/JP2005/002885

§ 371 (c)(1), (2), (4) Date: Jun. 30, 2008

(87) PCT Pub. No.: WO2005/090260

PCT Pub. Date: Sep. 29, 2005

(65) Prior Publication Data

US 2008/0253060 A1    Oct. 16, 2008

(30) Foreign Application Priority Data

Mar. 19, 2004 (JP) .......................... 2004-079696

(51) Int. Cl.
H01G 4/06 (2006.01)
(52) U.S. Cl. .................. 361/321.4; 361/321.5; 501/136
(58) Field of Classification Search ... 361/321.1–321.5, 361/311; 501/134–136
See application file for complete search history.

(56) References Cited

U.S. PATENT DOCUMENTS

| | | |
|---|---|---|
| 5,258,338 A | 11/1993 | Maher |
| 6,403,513 B1 * | 6/2002 | Sato et al. .................. 501/137 |
| 6,999,302 B2 | 2/2006 | Ito et al. |

(Continued)

FOREIGN PATENT DOCUMENTS

DE    101 21 503    1/2002

(Continued)

OTHER PUBLICATIONS

European Search Report issued Aug. 20, 2010, in PCT/JP2005/002885 filed on Feb. 23, 2005.

(Continued)

*Primary Examiner*—Eric Thomas
(74) *Attorney, Agent, or Firm*—Oblon, Spivak, McClelland, Maier & Neustadt, L.L.P.

(57) ABSTRACT

A multilayer ceramic capacitor having a laminate including alternately stacked dielectric layers of a sintered compact composed of crystal particles of a dielectric porcelain composite and internal-electrode layers. The dielectric porcelain composite comprises a primary constituent containing barium titanate; a first accessory constituent composed of at least one of MgO, CaO, BaO, and SrO; a second accessory constituent containing silicon oxide as a major constituent; a third accessory constituent composed of at least one of $V_2O_5$, $MoO_3$, and $WO_3$; a fourth accessory constituent composed of an oxide of R1 (wherein R1 is at least one of Sc, Er, Tm, Yb, and Lu); a fifth accessory constituent composed of $CaZrO_3$ or a combination of CaO and $ZrO_2$; and a sixth accessory constituent composed of an oxide of R2 (wherein R2 is at least one of Y, Dy, Ho, Tb, Gd, and Eu).

18 Claims, 4 Drawing Sheets

U.S. PATENT DOCUMENTS

| | | |
|---|---|---|
| 7,061,748 B2 | 6/2006 | Ito et al. |
| 2005/0219794 A1 | 10/2005 | Iguchi et al. |

FOREIGN PATENT DOCUMENTS

| | | | |
|---|---|---|---|
| EP | 1 094 477 | | 4/2001 |
| JP | 11 251173 | | 9/1999 |
| JP | 2001316176 A | * | 11/2001 |
| JP | 3348081 | | 9/2002 |

OTHER PUBLICATIONS

U.S. Appl. No. 11/077,281, filed Mar. 11, 2005, Iguchi, et al.

* cited by examiner

LAMINATED CERAMIC CAPACITOR

TECHNICAL FIELD

The present invention relates to multilayer (laminated) ceramic capacitors, more specifically, relates to multiplayer ceramic capacitors having capacitance with an excellent long-term stability and satisfying the X8R characteristic.

BACKGROUND ART

Multilayer ceramic capacitors are compact, have a high capacitance, and are highly reliable, and thereby are widely used as electronic components. Recently, multilayer ceramic capacitors have been increasingly required to be further miniaturized, increased in capacitance, less expensive, and highly reliable, according to the development of miniaturized high-performance equipment.

Multilayer ceramic capacitors are usually manufactured by stacking a paste for internal electrode layers and a paste for dielectric layers by a sheet method or a printing method to make a laminate, and then firing the laminate to simultaneously fire the internal electrode layers and the dielectric layers.

The conductive material for the internal electrode layers is generally Pd or a Pd-alloy, but Pd is expensive. Consequently, base metals such as Ni and Ni-alloys, which are relatively inexpensive, have been used. However, when a base metal is used as a conductive material for internal electrode layers, oxidization of the internal electrode layers is caused by the firing in an atmosphere. Therefore, in order to simultaneously fire dielectric layers and internal electrode layers, the firing must be conducted in a reducing atmosphere. However, when the firing is conducted in a reducing atmosphere, reduction of the dielectric layers occurs and thereby the specific resistance is decreased. Consequently, non-reducing dielectric materials have been developed.

However, in a multilayer ceramic capacitor using a non-reducing dielectric material, the insulating resistance (IR) is significantly deteriorated by the application of an electric field (i.e., the IR lifetime is short), and therefore the reliability of such a capacitor is low; which is a problem.

In addition, the relative dielectric constant $\in_r$ decreases with time under the application of a direct electric field; which is also a problem. Furthermore, a capacitor may be used under the application of a direct-current voltage. Generally, the application of a direct-current voltage causes problems to a capacitor having a dielectric material primarily composed of a ferroelectric, i.e., the dielectric constant changing characteristics depending on the applied direct-current voltage (DC bias characteristics), and the capacitance-temperature characteristics (Tc bias characteristics) under the application of a direct-current voltage decrease. In particular, the electric field applied to dielectric layers increases under the application of a direct-current voltage, if the thickness of each dielectric layer is decreased for reducing the size and increasing the capacitance of a chip capacitor according to recent requirements. Therefore, the amount of change in the relative dielectric constant $\in_r$ significantly increases with time, namely, the capacitance significantly changes with time; and the DC bias characteristics and the Tc bias characteristics decrease. Thus, the problems become more prominent.

In addition, capacitors are required to have excellent temperature characteristics. In particular, constant temperature characteristics must be maintained under strict conditions, depending on the application. Recently, multilayer ceramic capacitors have been used in various electronic devices installed in the engine compartment of an automobile, for example, an engine control unit (ECU), a crank angle sensor, and an antilock break system (ABS) module. Since these electronic devices are for stable engine control, drive control, and break control, the circuits must have excellent temperature stability.

It is predicted that the temperature of the environment in which these electronic devices are used decreases to about −20° C. or less in winter in a cold district and increases to about +130° C. or more after starting the engine in summer. Recently, there has been a tendency to reduce the number of wiring harness connecting electronic devices with instruments controlled by the electronic devices. Therefore, the electronic devices may be located on the outside of automobiles. Thus, the environment for electronic devices is becoming stricter. Consequently, capacitors used in these electronic devices are required to have stable temperature characteristics over a broad temperature range.

Temperature-compensating capacitors with excellent temperature characteristics are generally made of (Sr, Ca)(Th, Zr)O$_3$-based or Ca(Ti, Zr)O$_3$-based materials. However, these constituents have very low relative dielectric constants (generally 100 or less). Therefore, it will be impossible to produce capacitors having a large capacitance.

Dielectric porcelain composites having high dielectric constants and stable capacitance-temperature characteristics are generally made of compositions containing BaTiO$_3$ as the primary constituent and Nb$_2$O$_5$—Co$_3$O$_4$, MgO—Y, a rare-earth element (such as Dy or Ho), Bi$_2$O$_3$—TiO$_2$ and the like. However, BaTiO$_3$-based materials with high dielectric constants satisfy only the X7R characteristic (ΔC/C is within ±15% at −55 to 125° C.) specified by the EIA standard and therefore cannot be applied to electronic devices of automobiles used in the above-mentioned strict environment. The above-mentioned electronic devices are required to use dielectric porcelain composites satisfying the X8R characteristic (ΔC/C is within ±15% at −55 to 150° C.) specified by the EIA standard.

As regards composites which have high relative dielectric constants, satisfy the X8R characteristic, and allow to be fired in a reducing atmosphere, the present inventors have already disclosed dielectric porcelain composites shown below (for example, see Patent Documents 1 and 2).

The Patent Document 1 discloses a dielectric porcelain composite containing a primary constituent containing barium titanate; a first accessory constituent containing at least one of MgO, CaO, BaO, SrO, and Cr$_2$O$_3$; a second accessory constituent containing silicon oxide as a major constituent; a third accessory constituent containing at least one of V$_2$O$_5$, MoO$_3$, and WO$_3$; a fourth accessory constituent containing an oxide of R1 (wherein R1 is at least one of Sc, Er, Tm, Yb, and Lu); and a fifth accessory constituent containing CaZrO$_3$ or a combination of CaO and ZrO$_2$. In the case of 100 moles of the primary constituent, there are 0.1 to 3 moles of the first accessory constituent, 2 to 10 moles of the second accessory constituent, 0.01 to 0.5 moles of the third accessory constituent, 0.5 to 7 moles of the fourth accessory constituent (wherein the number of moles of the fourth accessory constituent is that of R1 alone), and more than 0 but not more than 5 moles of the fifth accessory constituent.

The Patent Document 2 discloses a dielectric porcelain composite containing a primary constituent containing barium titanate; a first accessory constituent containing an oxide of AE (wherein AE is at least one of Mg, Ca, Ba, and Sr); and a second accessory constituent containing an oxide of R (wherein R is at least one of Y, Dy, Ho, and Er). In the case of 100 moles of the primary constituent, there are more than 0 but not more than 0.1 moles of the first accessory constituent and more than 1 mole and less than 7 moles of the second accessory constituent.

Patent Document 1: Japanese Patent No. 3348081
Patent Document 2: Japanese Patent No. 3341003

DISCLOSURE OF INVENTION

Problems to be Solved by the Invention

The dielectric porcelain composites disclosed in the Patent Documents 1 and 2 have high relative dielectric constants, satisfy the X8R characteristic ($\Delta C/C$ is within $\pm 15\%$ at $-55$ to $150°$ C.) specified by the EIA standard, and allowing to be fired in a reducing atmosphere because the composite does not contain Pb, Bi, or Zn. However, in some dielectric porcelain composites disclosed in the Patent Documents 1 and 2, the Tc bias characteristics and the capacitance deterioration with time significantly become worse if the thickness of dielectric layer is further decreased and the number of layer is further increased for miniaturizing the capacitors and increasing the capacitances or if the rated voltage is increased.

The present invention has been accomplished to solve the above-mentioned problems. It is an object to provide a multilayer ceramic capacitor which has capacitance-temperature characteristics satisfying the X8R characteristic specified by the EIA standard and has capacitance not largely changing with time even if the thickness of the dielectric layer is further decreased and the number of layer is increased for downsizing the capacitor and increasing the capacitance or if the rated voltage is increased.

Means for Solving the Problem

In order to achieve the above-mentioned object, the present invention provides a multilayer ceramic capacitor including a laminate having alternately stacked internal-electrode layers and dielectric layers of a sintered compact composed of crystal particles of a dielectric porcelain composite. The crystal particles have an average particle diameter of not less than 0.2 µm and less than or equal to 0.55 µm. The dielectric porcelain composite at least contains a primary constituent containing barium titanate; a first accessory constituent composed of at least one of magnesium oxide (MgO), calcium oxide (CaO), barium oxide (BaO), and strontium oxide (SrO); a second accessory constituent containing silicon oxide as a major constituent; a third accessory constituent composed of at least one of vanadium oxide ($V_2O_5$), molybdenum oxide ($MoO_3$), and tungsten oxide ($WO_3$); a fourth accessory constituent composed of an oxide of R1 (wherein R1 is at least one of Sc, Er, Tm, Yb, and Lu); a fifth accessory constituent composed of $CaZrO_3$ or a combination of CaO and $ZrO_2$; and a sixth accessory constituent composed of an oxide of R2 (wherein R2 is at least one of Y, Dy, Ho, Tb, Gd, and Eu). In the case of 100 moles of barium titanate, there are 0.1 to 3 moles of the first accessory constituent, 2 to 10 moles of the second accessory constituent, 0.01 to 0.5 moles of the third accessory constituent, 0.5 to 7 moles of the fourth accessory constituent (wherein the number of moles of the fourth accessory constituent is that of R1 alone), more than 0 but not more than 5 moles of the fifth accessory constituent, and more than 0 but not more than 9 moles of the sixth accessory constituent.

In the multilayer ceramic capacitor having dielectric layers constituted by crystal particles having an average particle diameter within the above-mentioned range, the capacitance-temperature characteristics satisfy the X8R characteristic ($\Delta C/C$ is within $\pm 15\%$ at $-55$ to $150°$ C.) specified by the EIA standard and the amount of change over time in capacitance is small.

In the multilayer ceramic capacitor according to the present invention, it is preferable that the dielectric porcelain composite further comprises a seventh accessory constituent composed of manganese oxide (MnO) or chromium oxide ($Cr_2O_3$) and there be 0.01 to 0.5 moles of the seventh accessory constituent in the case of 100 moles of barium titanate.

In the multilayer ceramic capacitor according to the present invention, it is preferable that the average particle diameter of the crystal particles constituting the dielectric layers be in the range of not less than 0.2 µm and less than or equal to 0.35 µm.

The multilayer ceramic capacitor including dielectric layers constituted by the crystal particles having an average particle diameter within the above-mentioned range has excellent Tc bias characteristics in addition to the above-mentioned characteristics.

The multilayer ceramic capacitor according to the present invention, the difference (hereinafter sometimes referred to as a (D100-D50) value) between the maximum particle diameter (D100) and the average particle diameter (D50) of the crystal particles constituting the dielectric layers is 0.4 µm or less.

The multilayer ceramic capacitor including dielectric layers having a (D100-D50) value of 0.4 µm or less is superior in Tc bias characteristics.

Advantageous Effect Of The Invention

As described above, the multilayer ceramic capacitor of the present invention is specified by the average particle diameter of the crystal particles constituting the dielectric layers. Therefore, in multilayer ceramic capacitors including dielectric layers composed of such crystal particles, the capacitance-temperature characteristics satisfy the X8R characteristic ($\Delta C/C$ is within $\pm 15\%$ at $-55$ to $150°$ C.) specified by the EIA standard and the amount of change over time in capacitance is small, and the Tc bias characteristics are excellent. Therefore, the usefulness of the multilayer ceramic capacitors is significantly increased when the thickness of dielectric layer is further decreased for decreasing the size and for increasing the capacitance or when the rated voltage is increased. In particular, the multilayer ceramic capacitor can be effectively applied to automobiles used in a strict environment. In addition, in the multilayer ceramic capacitor of the present invention, the dielectric porcelain composite does not contain Pb, Bi, or Zn. Therefore, the firing can be conducted in a reducing atmosphere and also the amount of change over time in capacitance under a direct electric field is small.

Figure 1:
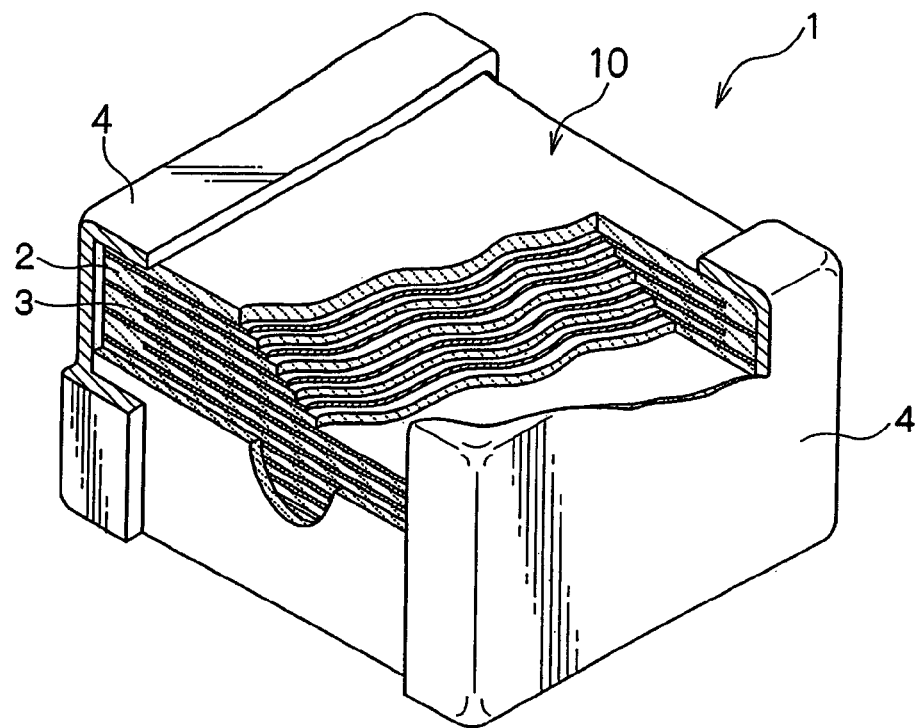
FIG. 1 is a perspective view, partially cut-away, schematically showing an example of the multilayer ceramic capacitor of the present invention.

| Reference Numerals | |
|---|---|
| 1 | multilayer ceramic capacitor |
| 2 | dielectric layer |
| 3 | internal electrode layer |
| 4 | external electrode |
| 10 | multilayer dielectric device |

BEST MODE FOR CARRYING OUT THE INVENTION

The multilayer ceramic capacitor according to the present invention will now be described with reference to the drawings. The scope of the present invention is not limited to the embodiments described below.

(Multilayer ceramic capacitor)

Figure 2:
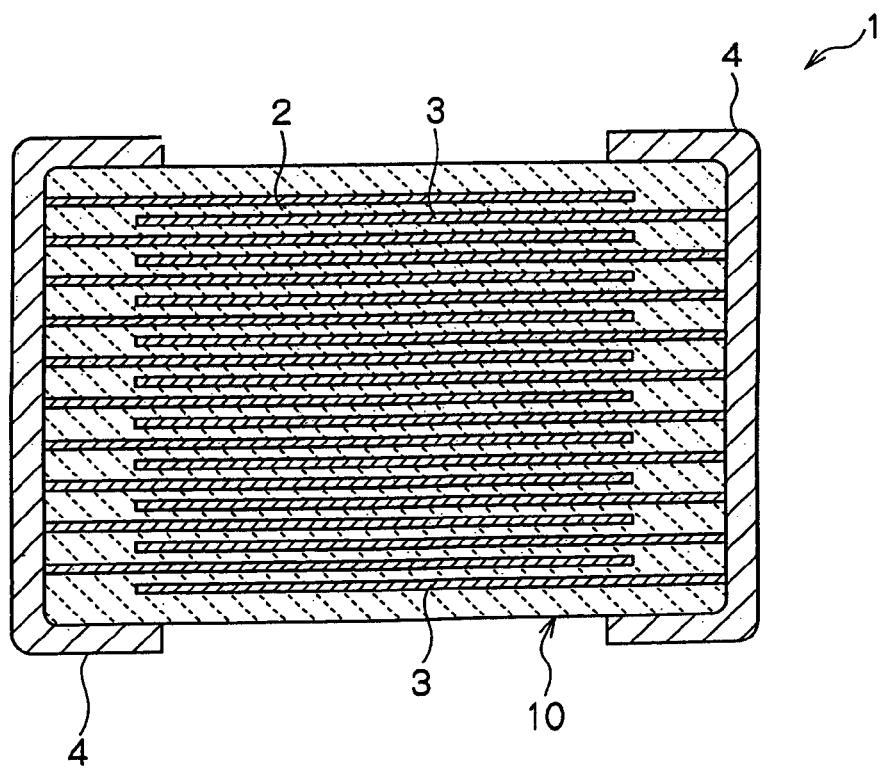
FIG. 2 is a cross-sectional view schematically showing a fundamental structure of the multilayer ceramic capacitor of the present invention.

FIG. 1 is a perspective view, partially cut-away, schematically showing an example of the multilayer ceramic capacitor of the present invention. FIG. 2 is a cross-sectional view schematically showing a fundamental structure of the multilayer ceramic capacitor of the present invention.

As shown in FIGS. 1 and 2, the multilayer ceramic capacitor of the present invention includes a laminate (hereinafter referred to as multilayer dielectric device 10 or device 10) having alternately stacked dielectric layers 2 and internal electrode layers 3. A pair of external electrodes 4 is disposed at both sides of the multilayer dielectric device 10 so as to be electrically connected to the internal electrode layers 3 alternately arranged in the device 10. The shape of the multilayer dielectric device 10 is usually a rectangular parallelepiped but is not specifically limited to this. The size is not specifically limited, but the device 10 usually has a long side of about 0.6 to 5.6 mm, a short side of about 0.3 to 5.0 mm, and a height of about 0.3 to 1.9 mm.

The dielectric layers 2 are formed of a sintered compact composed of crystal particles of a dielectric porcelain composite at least including a primary constituent containing barium titanate; a first accessory constituent composed of at least one of magnesium oxide (MgO), calcium oxide (CaO), barium oxide (BaO), and strontium oxide (SrO); a second accessory constituent containing silicon oxide as a major constituent; a third accessory constituent composed of at least one of vanadium oxide ($V_2O_5$), molybdenum oxide ($MoO_3$), and tungsten oxide ($WO_3$); a fourth accessory constituent composed of an oxide of R1 (wherein R1 is at least one of Sc, Er, Tm, Yb, and Lu); a fifth accessory constituent composed of $CaZrO_3$ or a combination of CaO and $ZrO_2$; and a sixth accessory constituent composed of an oxide of R2 (wherein R2 is at least one of Y, Dy, Ho, Tb, Gd, and Eu).

In the case of 100 moles of barium titanate ($BaTiO_3$), there are 0.1 to 3 moles of the first accessory constituent, 2 to 10 moles of the second accessory constituent, 0.01 to 0.5 moles of the third accessory constituent, 0.5 to 7 moles of the fourth accessory constituent, and more than 0 but not more than 5 moles of the fifth accessory constituent; and preferably, 0.5 to 2.5 moles of the first accessory constituent, 2.0 to 5.0 moles of the second accessory constituent, 0.1 to 0.4 moles of the third accessory constituent, 0.5 to 5.0 moles of the fourth accessory constituent, 0.5 to 3 moles of the fifth accessory constituent, and more than 0 but not more than 9 moles of the sixth accessory constituent.

The above-mentioned ratio of the fourth accessory constituent is not a molar ratio of the oxide of R1 but that of R1 alone. That is, for example, when the fourth accessory constituent is an oxide of Yb, the molar ratio that the fourth accessory constituent is 1 mole does not mean that the molar ratio of $Yb_2O_3$ is 1 mole but that of Yb is 1 mole.

Throughout the description, barium titanate and each oxide constituting the accessory constituents are represented by stoichiometric compositions, but the oxidation state of each oxide may be deviate from the stoichiometric compositions. In this regard, the ratio of each accessory constituent is obtained on the basis of the amount of an oxide as the stoichiometric composition converted from the amount of metal contained in the oxide constituting each accessory constituent.

The content of each accessory constituent is limited by the following reasons:

The first accessory constituent is composed of at least one of magnesium oxide (MgO), calcium oxide (CaO), barium oxide (BaO), and strontium oxide (SrO). When the content of the first accessory constituent is less than 0.1 moles, the percentage change in capacitance-temperature characteristics is increased. On the other hand, the content of the first accessory constituent is more than 3 moles, the sintering characteristics are deteriorated. The constituent ratio of each oxide in the first accessory constituent may be optionally determined.

The second accessory constituent contains silicon oxide as a major constituent. When the content of the second accessory constituent is less than 2 moles, the capacitance-temperature characteristics are deteriorated and the insulating resistance (IR) is decreased. On the other hand, when the content of the secondary constituent is more than 10 moles, the IR lifetime becomes insufficient and a sharp decrease in the dielectric constant occurs. The second accessory constituent preferably contains silicon oxide ($SiO_2$) as a major constituent and at least one of MO (wherein M is at least one element of Ba, Ca, Sr, and Mg), lithium oxide ($Li_2O$), and boric oxide ($B_2O_3$). The second accessory constituent mainly serves as a sintering assistant and also has a function for improving the failure rate of the initial insulating resistance when the thickness of the layer is decreased. More preferably, the second accessory constituent is represented by $(Ba, Ca)_xSiO_{2+x}$ (wherein x is 0.7 to 1.2). Barium oxide (BaO) and calcium oxide (CaO) in $[(Ba, Ca)_xSiO_{2+x}]$, which is the more preferable second accessory constituent, are contained in the first accessory constituent too. A combined oxide $(Ba, Ca)_xSiO_{2+x}$ has a low melting point to exhibit good reactivity with barium titanate. Therefore, in the present invention, BaO and/or CaO may be preferably added as the above-mentioned combined oxide. The x in $(Ba, Ca)_xSiO_{2+x}$ as the more preferable second accessory constituent is preferably 0.7 to 1.2, more preferably 0.8 to 1.1. When the x is too small, namely, the $SiO_2$ amount is too high, $SiO_2$ reacts with the primary constituent $BaTiO_3$ and thereby the dielectric characteristics are deteriorated. On the other hand, when the x is too large, the melting point is increased and thereby the sintering characteristics are disadvantageously deteriorated. The ratio between Ba and Ca may be optionally determined and only one of them may be contained.

The third accessory constituent is composed of at least one of vanadium oxide ($V_2O_5$), molybdenum oxide ($MoO_3$), and tungsten oxide ($WO_3$). The third accessory constituent has functions for maintaining constant capacitance-temperature characteristics at a temperature above the Curie temperature and for improving the IR lifetime. When the content of the third accessory constituent is less than 0.01 moles, these functions cannot be sufficiently achieved. On the other hand, when the content of the third accessory constituent is more than 0.5 moles, the IR is significantly decreased. The constituent ratio of each oxide in the third accessory constituent may be optionally determined.

The fourth accessory constituent is composed of an oxide of R1 (wherein R1 is at least one of Sc, Er, Tm, Yb, and Lu). The fourth accessory constituent has functions for shifting the Curie temperature toward the higher side and for maintaining constant capacitance-temperature characteristics. When the content of the fourth accessory constituent is less than 0.5 moles, these functions cannot be sufficiently achieved and the capacitance-temperature characteristics are deteriorated. On the other hand, when the content of the fourth accessory constituent is more than 7 moles, the sintering characteristics tend to be deteriorated. The fourth accessory constituent is preferably an oxide of Yb because the oxide has a high effect on the characteristic improvement and is inexpensive.

The fifth accessory constituent is composed of $CaZrO_3$ or a combination of CaO and $ZrO_2$. The fifth accessory constituent has functions for shifting the Curie temperature toward the higher side and for maintaining constant capacitance-temperature characteristics, and additionally, has functions for improving the CR product and direct-current insulation-breaking strength. When the content of the fifth accessory constituent is more than 5 moles, the IR acceleration lifetime and the capacitance-temperature characteristics (X8R characteristic) may be deteriorated. The configuration of the fifth accessory constituent, $CaZrO_3$, to be added is not specifically limited. $CaZrO_3$ may be added as an oxide of Ca, such as CaO, a carbonate such as $CaCO_3$, an organic compound, or $CaZrO_3$. The ratio between Ca and Zr is not specifically limited as long as they do not become solid soluble to barium titanate. The molar ratio of Ca to Zr (Ca/Zr) is preferably 0.5 to 1.5, more preferably 0.8 to 1.5, further preferably 0.9 to 1.1.

The constant capacitance-temperature characteristics (X8R characteristic) can be maintained and the high-temperature acceleration lifetime and the like can be improved by adjusting the contents of the fourth accessory constituent (oxide of R1) and the fifth accessory constituent ($CaZrO_3$ or a combination of CaO and $ZrO_2$). In particular, in the above-mentioned content ranges, the generation of a heterophase state can be suppressed and thereby the composition is homogenized.

The sixth accessory constituent is composed of an oxide of R2 (wherein R2 is at least one of Y, Dy, Ho, Tb, Gd, and Eu). The sixth accessory constituent has functions for improving the IR and the IR lifetime and hardly has negative effect on the capacitance-temperature characteristics. However, when the content of R2 is more than 9 moles for 100 moles of barium titanate, the sintering characteristics tend to be deteriorated. Therefore, the content of R2 for 100 moles of barium titanate is preferably below 9 moles, more preferably 0.5 to 9 moles.

The sixth accessory constituent is preferably an oxide of Y because the oxide has a high effect on the characteristic improvement and is inexpensive.

The total content of the fourth and sixth accessory constituents for 100 moles of barium titanate is preferably 13 moles or less, more preferably 10 moles or less (wherein the molar ratios of the fourth and sixth accessory constituents is that of R1 and R2 alone) to maintain the favorable sintering characteristics.

The dielectric porcelain composite may include manganese oxide (MnO) or chromium oxide ($Cr_2O_3$) as a seventh accessory constituent. The seventh accessory constituent has functions for accelerating the sintering, increasing the IR, and improving the IR lifetime. In order to sufficiently achieve these functions, the ratio of the seventh accessory constituent for 100 moles of barium titanate is preferably 0.01 moles or more. However, when the content of the seventh accessory constituent is too high, the capacitance-temperature characteristics are negatively affected. Therefore, the content is preferably 0.5 moles or less. The number of moles of the seventh accessory constituent is that of Mn or Cr alone.

The dielectric porcelain composite may include aluminum oxide ($Al_2O_3$) in addition to the above-mentioned oxides. $Al_2O_3$ hardly affects on the capacitance-temperature characteristics and has functions for improving the sintering characteristics, the IR, and the IR lifetime. However, when the content of $Al_2O_3$ is too high, the sintering characteristics are deteriorated and the IR is decreased. Therefore, the content of $Al_2O_3$ is preferably 1 mole or less for 100 moles of barium titanate, more preferably 1 mole or less for the total amount of the dielectric porcelain composite.

The Curie temperature (phase transition temperature from a ferroelectric phase to a paraelectric phase) of the dielectric porcelain composite can be changed by properly adjusting the composition of the dielectric porcelain composite. In order to satisfy the X8R characteristic, the Curie temperature is preferably 120° C. or more, more preferably 123° C. or more. The Curie temperature can be measured by differential scanning calorimetry (DSC) and the like. When at least one of Sr, Zr, and Sn is substituted for Ba or Ti in barium titanate constituting a perovskite structure, the Curie temperature is shifted toward the lower side. Therefore, the capacitance-temperature characteristics at temperatures higher than 125° C. are deteriorated. Consequently, it is preferable that the primary constituent should not be barium titanate-based combined oxides containing these elements [for example, (Ba, Sr)$TiO_3$]. However, it is not a problem when the at least one of Sr, Zr, and Sn is contained only at an impurity level (for example, about 0.1 mol % or less of the total dielectric porcelain composite).

The crystal particles (hereinafter referred to as "dielectric particles") constituting the dielectric layers 2 will now be described.

The crystal particles constitute the dielectric layers 2. In the present invention, it is characteristic that the average particle diameter of the dielectric particles is in the range of 0.2 to 0.55 µm. By adjusting the average particle diameter of the dielectric particles to this range, the produced multilayer ceramic capacitor has capacitance-temperature characteristics satisfying the X8R characteristic (ΔC/C is within ±15% at −55 to 150° C.) specified by the EIA standard. In addition, the amount of change over time in capacitance is small.

In the dielectric particles having an average particle diameter of less than 0.2 µm, the capacitance-temperature characteristics may not satisfy the X8R characteristic when the thickness of the dielectric layer 2 is decreased (for example, the thickness between layers is less than 3.5 µm) or when the number of layer in the multilayer dielectric device 10 is increased (for example, the number of the dielectric layer 2 is 100 or more). When the average particle diameter of the dielectric particles is larger than 0.55 µm, the amount of change over time in capacitance is increased so that the capacitor may not be used as a stable one.

In the present invention, the average particle diameter of the dielectric particles is preferably in the range from 0.2 µm to 0.35 µm. When the average particle diameter of the dielectric particles is within this range, the resulting multilayer ceramic capacitor has excellent Tc bias characteristics in addition to the characteristics that the capacitance-temperature characteristics satisfy the X8R characteristic specified by the EIA standard and the amount of change over time in capacitance is small. In particular, multilayer ceramic capacitors having excellent Tc bias characteristics can be obtained by adjusting the average particle diameter of the dielectric particles in this composition to 0.35 µm or less.

In the present invention, the difference (D100-D50 value) between the maximum particle diameter (D100) and the average particle diameter (D50) of the dielectric particles is preferably 0.4 µm or less. When the dielectric particles are prepared so as to have a (D100-D50) value of 0.4 µm or less, the resulting multilayer ceramic capacitor has excellent Tc bias characteristics in addition to the characteristics that the capacitance-temperature characteristics satisfy the X8R characteristic specified by the EIA standard and the amount of change over time in capacitance is small.

In the present invention, the average particle diameter of the dielectric particles is determined by a chord method. The (D100-D50) value represents the difference between the maximum particle diameter (D100) and the average particle diameter (D50). The maximum particle diameter and the average particle diameter are calculated from previously obtained particle size distribution of the dielectric particles constituting the dielectric layers 2. A small (D100-D50) value means that the size variation of the dielectric particles constituting the dielectric layers 2 is small.

The state that the capacitance-temperature characteristics satisfy the X8R characteristic specified by the EIA standard means that the produced multilayer ceramic capacitor can be suitably used as an electronic component of equipment used in an environment at 80° C. or more, in particular, 125 to 150° C. In addition, in such a temperature range, the capacitance-temperature characteristics satisfy the R characteristic specified by the EIAJ standard and also satisfy the X8R characteristic ($\Delta C/C$ is within ±15% at −55 to 150° C.) specified by the EIA standard. Furthermore, the capacitance-temperature characteristics also satisfy both the B characteristic [the percentage change in capacitance is within ±10% at −25 to 85° C. (reference temperature: 20° C.)] specified by the JIS standard and the X7R characteristic ($\Delta C$ is within ±15% at −55 to 125° C.) specified by the EIA standard.

The state that the capacitance has an excellent long-term stability means that the percentage change in capacitance is within 10% when a produced multilayer ceramic capacitor is applied with a direct-current voltage of 7 V/µm for 1000 hours in a temperature environment of 85° C., for example.

The state that the Tc bias characteristics are excellent means that the capacitance-temperature characteristics are stable and the percentage change in capacitance under Tc bias is, for example, within 40% even when a produced multilayer ceramic capacitor is applied with an alternating electric field of 0.02 V/µm or more, in particular, 0.2 V/µm or more, furthermore, 0.5 V/µm but generally about 5 V/µm or less and is simultaneously applied with a direct electric field of 5 V/µm or less.

The conditions such as the number and the thickness of the dielectric layer 2 may be optionally determined according to the object and application. Preferably, the thickness of the dielectric layer 2 is generally 30 µm or less. More preferably, the thickness of the dielectric layer 2 is 10 µm or less from the viewpoint of decreasing the size and increasing the capacitance. In the multilayer ceramic capacitor having the thus decreased thickness of the dielectric layer 2, a decrease in the size and an increase in the capacitance can be achieved and, at the same time, an improvement in the capacitance-temperature characteristics is effectively achieved by specifying the average particle diameter of the dielectric particles constituting the dielectric layers 2. While there is no specific lower limit of the thickness of the dielectric layer 2, the practical lower limit would be about 0.5 µm. The number of the dielectric layer 2 is generally about 50 to 1000.

The internal electrode layers 3 are disposed so as to be alternate to the above-described dielectric layers 2. The end faces of the internal electrode layers 3 are alternately exposed at two opposing end surfaces of the multilayer dielectric device 10. In addition, a pair of external electrodes 4 is disposed at both ends of the multilayer dielectric device 10 so as to be connected to the exposing end faces of the alternately disposed nickel internal electrode layers 3. Thus, the multilayer ceramic capacitor is structured.

The internal electrode layers 3 are formed of a conductive base material which substantially serves as an electrode. Specifically, Ni or a Ni-alloy is preferable. A preferable Ni-alloy is an alloy of Ni with one or more of Mn, Cr, Co, Al, and W and the like. The content of Ni in the alloy is preferably 95 wt % or more. In addition, Ni or a Ni-alloy may contain various miner constituents such as P, C, Nb, Fe, Cl, B, Li, Na, K, F, and S at 0.1 wt % or less. The conditions such as the number and the thickness of the internal electrode layer 3 may be optionally determined according to the object and application. Generally, the thickness is preferably in the range of about 0.1 to 3.0 µm, more preferably 0.2 to 2.0 µm.

The pair of external electrodes 4 are connected to each of the internal electrode layers 3 alternately disposed inside the multilayer dielectric device 10 and are disposed on both ends of the multilayer dielectric device 10. Generally, the external electrodes 4 may be made of at least one of Ni, Pd, Ag, Au, Cu, Pt, Rh, Ru, Ir and the like, and alloys thereof. In general, Cu, a Cu-alloy, Ni, a Ni-alloy, Ag, an Ag—Pd-alloy, or an In—Ga alloy and the like is used. While the thickness of the external electrode 4 may be optionally determined according to the application, generally, a thickness of about 10 to 200 µm is preferable.

(Method for Manufacturing Multilayer Ceramic Capacitor)

The multilayer ceramic capacitor according to the present invention is manufactured, as in known multilayer ceramic capacitor manufacturing, by the preparation of a green chip by a usual printing method or a sheet method using a paste, the firing of the green chip, the printing or transferring of external electrodes, and the firing. The manufacturing process will now be specifically described.

The paste for the dielectric layers may be an organic coating prepared by kneading a dielectric material and an organic vehicle, or an aqueous coating.

The above-mentioned oxides, a mixture thereof, or a combined oxide can be used for the dielectric material. In addition, various compounds which become the above-mentioned oxides or combined oxides by firing may be used. For example, compounds optionally selected from carbonates, oxalates, nitrates, hydroxides, and organic metal compounds and the like are mixed and used. The contents of each compound in the dielectric material are determined so that the dielectric porcelain composite after firing has the composition described above. Usually, the dielectric material is a powder having an average particle diameter of about 0.1 to 3 µm. The desired average particle diameter can be obtained by controlling the mixing time of raw materials.

The organic vehicle is a product of dissolving a binder in an organic solvent. There is not any limitation in the binder used in the organic vehicle. A binder, such as ethyl cellulose or polyvinyl butyral which is usually used, may be optionally selected. In addition, any organic solvent may be used without specific limitation and may be optionally selected from various organic solvents such as terpineol, butyl carbitol, acetone, and toluene according to the application method such as a printing method and a sheet method.

When the paste for the dielectric layers is an aqueous coating, the aqueous coating may be prepared by kneading an aqueous vehicle and a dielectric material. The aqueous vehicle may be prepared by dissolving an aqueous binder or dispersant in water. The aqueous binder used in the aqueous vehicle is not specifically limited. For example, polyvinyl alcohol, cellulose, or aqueous acrylic resin may be used.

The paste for the internal electrode layers is prepared by kneading the above-mentioned organic vehicle and conductive materials composed of the above-mentioned various dielectric metals or alloys, various oxides which become the above-mentioned conductive materials after firing, organic metal compounds, or resinates and the like. The paste for the external electrodes may be prepared by the same manner as in the paste for the internal electrode layers.

The content of the organic vehicle in each paste is not specifically limited, namely, the organic vehicle may be used at a usual content. For example, the content of the binder may be about 1 to 5 wt % and the content of the solvent may be about 10 to 50 wt %. In addition, each paste may contain an additive selected from various dispersants, plasticizers, dielectric materials, and insulating materials and the like, if necessary. The total content of these additives may be preferably 10 wt % or less.

When a printing method is employed, a green chip is formed by stacking a paste for dielectric layers and a paste for internal electrode layers on a substrate such as PET by printing, after the cutting into a predetermined shape, peeling the pastes from the substrate. When a sheet method is employed, a green chip is formed by preparing green sheets of a paste for dielectric layers, printing a paste for internal electrode layers on each green sheet, and stacking these sheets.

The green chip is applied to binder removal before firing. The binder removal may be conducted under usual conditions. When the conductive material for internal electrode layers is a base metal such as Ni or a Ni-alloy, the binder removal is conducted in an air atmosphere by heating at a rate of preferably 5 to 300° C./h, more preferably 10 to 100° C./h and maintaining the temperature at preferably 180 to 400° C., more preferably 200 to 300° C. for preferably 0.5 to 24 hours, more preferably 5 to 20 hours.

The atmosphere for firing the green chip may be optionally determined according to the conductive material in the paste for internal electrode layers. When the conductive material is a base metal such as Ni or a Ni-alloy, the oxygen partial pressure in the firing atmosphere is preferably $10^{-8}$ to $10^{-12}$ atm. When the oxygen partial pressure is lower than the above-mentioned range, the conductive material of the internal electrode layers may be abnormally fired to be broken. When the oxygen partial pressure is higher than the above-mentioned range, the internal electrode layers tend to be oxidized.

The temperature for the firing is preferably maintained at 1100 to 1400° C., more preferably 1200 to 1360° C., further preferably 1200 to 1340° C. When the temperature is lower than the above-mentioned range, the densification tends to be insufficient. When the temperature is higher than the above-mentioned range, breakage of electrodes tends to be caused by abnormal firing of the internal electrode layers, the capacitance-temperature characteristics may be deteriorated by diffusion of the materials constituting the internal electrode layers, and reduction of the dielectric porcelain composite tends to occur.

The firing may be conducted under other conditions, i.e., the rate of heating is preferably 50 to 500° C./h, more preferably 200 to 300° C./h, the temperature is maintained for preferably 0.5 to 8 hours, more preferably 1 to 3 hours, and the rate of cooling is preferably 50 to 500° C./h, more preferably 200 to 300° C./h. The atmosphere for the firing is preferably a reducing atmosphere. For example, a moisturized gas mixture of $N_2$ and $H_2$ is a preferably used as atmospheric gas.

When the firing is conducted in a reducing atmosphere, the multilayer dielectric device is preferably annealed. The annealing is conducted for reoxidizing dielectric layers, and thereby the IR lifetime is significantly prolonged and the reliability of the device is improved.

The oxygen partial pressure in an atmosphere for the annealing is preferably $10^{-10}$ atm or more, particularly in the range of $10^{-7}$ to $10^{-6}$ atm. When the oxygen partial pressure is less than the above-mentioned range, the dielectric layers are difficulty reoxidized. When the oxygen partial pressure is higher than the above-mentioned range, the internal electrode layers tend to be oxidized.

The temperature during the annealing is maintained at preferably 1100° C. or less, in particular, in the range of 500 to 1100° C. When the temperature is maintained lower than the above-mentioned range, the oxidization of dielectric layers is insufficient and the IR is decreased. Therefore, the IR lifetime tends to be shortened. On the other hand, when the temperature is maintained higher than the above-mentioned range, the internal electrode layers are oxidized and thereby the capacitance is decreased. In addition, the internal electrode layers react with a dielectric base material; which readily causes deterioration of the capacitance-temperature characteristics, a decrease in the IR, and a decrease in the IR lifetime. The annealing process may be composed of only the heating process and the cooling process. That is, the time for maintaining the firing temperature at a constant level may be zero. In such a case, the temperature to be maintained is the highest temperature.

In addition to the above mentioned conditions, the time for maintaining the temperature for the annealing is preferable in the range of 0 to 20 hours, more preferably 6 to 10 hours. The cooling rate is preferably in the range of 50 to 500° C./h, more preferably 100 to 300° C./h. For example, a moisturized $N_2$ gas may be preferably used as atmospheric gas for annealing.

The $N_2$ gas or the gas mixture used in the binder removal, firing, or annealing may be moisturized by using, for example, a wetter. In this case, the water temperature is preferably in the range of about 5 to 75° C.

The binder removal, firing, and annealing may be conducted in series or separately. When these steps are conducted in series, it is preferably performed by removing the binder, changing the atmosphere without cooling, increasing the temperature to a level for firing and conducting the firing, then decreasing the temperature and changing the atmosphere when the temperature reaches the level for annealing, and conducting the annealing. When these steps are separately conducted, the firing is preferably conducted by increasing the temperature to a level for the binder removal under the atmosphere of $N_2$ gas or moisturized $N_2$ gas, then changing the atmosphere, and further increasing the temperature. In addition, after the cooling to a level for annealing, it is preferable to change the atmosphere to $N_2$ gas or moisturized $N_2$ gas and continue the cooling. The annealing may be preferably conducted by increasing the temperature to a level for annealing in a $N_2$ gas atmosphere and then changing the atmosphere, or all steps for annealing may be conducted in a moisturized $N_2$ gas atmosphere.

The thus obtained multilayer dielectric device is subjected to polishing of end faces by, for example, barreling or sandblasting. A paste for external electrodes is applied to the end faces by printing or transferring and then fired to form the external electrodes 4. The firing of the paste for external electrodes is preferably conducted in a moisturized gas mixture of $N_2$ and $H_2$ at 600 to 800° C. for about 10 min to 1 hr, for example. In addition, a covering layer may be formed on the external electrodes 4 by plating, if necessary. The thus produced multilayer ceramic capacitor of the present invention is mounted on a printed circuit board by soldering and is used in various types of electronic equipment.

The multilayer ceramic capacitor of the present invention and the manufacturing process are described above, but the present invention is not limited to such embodiments and various modifications not departing from the spirit of the present invention are considered as within the scope of the present invention.

EXAMPLES

The present invention will now be described in detail with reference to examples, but not limited to the description below.

Example 1

At first, as a starting raw-material for producing a dielectric material, a primary constituent ($BaTiO_3$) and a first to a seventh accessory constituents each having an average particle diameter of 0.1 to 1 μm were prepared. With respect to $BaTiO_3$, raw material powders were prepared so as to have an average particle diameter of about 0.1 to 0.33 μm and a specific surface of 3 to 8.5 in the measurement by a nitrogen absorption method. Specifically, 12 types of $BaTiO_3$ powder having a specific surface of 2.7, 3.5, 3.8, 4.1, 4.4, 4.8, 5.0, 5.4, 6.0, 7.0, 7.7, or 8.5 were synthesized by a solid-phase method. The method for preparing $BaTiO_3$ having a specific surface within the above-mentioned range is not limited to the solid-phase method. A liquid-phase method which is generally used may be employed.

Carbonates were used as raw materials for MgO and MnO (a first accessory constituent: $MgCO_3$, a seventh accessory constituent: $MnCO_3$). Oxides were used as raw materials for other accessory constituents (a second accessory constituent: $(Ba_{0.6}Ca_{0.4})SiO_3$, a third accessory constituent: $V_2O_5$, a fourth accessory constituent: $Yb_2O_3$, a fifth accessory constituent: $CaZrO_3$, and a sixth accessory constituent: $Y_2O_3$). The second accessory constituent, $(Ba_{0.6}Ca_{0.4})SiO_3$, was prepared by wet mixing of $BaCO_3$, $CaCO_3$, and $SiO_2$ in a ball mill for 16 hours, after drying, firing the mixture in air at 1150° C., and further conducting wet milling in a ball mill for 100 hours. The fifth accessory constituent, $CaZrO_3$, was prepared by wet mixing of $CaCO_3$ and $ZrO_2$ in a ball mill for 16 hours, after drying, firing the mixture in air at 1150° C., and further conducting wet milling in a ball mill for 24 hours.

These raw materials were blended so that the composition after firing contained, for 100 moles of $BaTiO_3$ as the primary constituent, 1.1 moles of $MgCO_3$ as the first accessory constituent, 2.5 moles of $(Ba_{0.6}Ca_{0.4})SiO_3$ as the second accessory constituent, 0.06 moles of $V_2O_5$ as the third accessory constituent, 2.00 moles of $Yb_2O_3$ as the fourth accessory constituent, 2.00 moles of $CaZrO_3$ as the fifth accessory constituent, 3.00 moles of $Y_2O_3$ as the sixth accessory constituent, and 0.3 moles of $MnCO_3$ as the seventh accessory constituent. The raw materials were wet mixed in a ball mill for 16 hours and then dried to obtain a dielectric material.

The thus prepared dried dielectric material (100 parts by weight) was mixed with an acrylic resin (4.8 parts by weight), methylene chloride (40 parts by weight), ethyl acetate (20 parts by weight), a mineral spirit (6 parts by weight), and acetone (4 parts by weight) in a ball mill to obtain a paste for dielectric layers.

Then, 100 parts by weight of Ni particles having an average particle diameter of 0.4 μm, 40 parts by weight of an organic vehicle (prepared by dissolving 8 parts by weight of ethyl cellulose in 92 parts by weight of butyl carbitol), and 10 parts by weight of butyl carbitol were kneaded by using a three-roll mill to obtain a paste for internal electrode layers.

Then, 100 parts by weight of Cu particles having an average particle diameter of 0.5 μm, 35 parts by weight of an organic vehicle (prepared by dissolving 8 parts by weight of ethyl cellulose resin in 92 parts by weight of butyl carbitol), and 7 parts by weight of butyl carbitol were kneaded to obtain a paste for external electrodes.

Then, a green sheet having a thickness of 4.5 μm was formed on a PET film by using the paste for dielectric layers. The paste for internal electrode layers was printed on the green sheet, and then the green sheet was peeled from the PET film. Then, the green sheets and other green sheets for protection (which were not printed with the paste for internal electrode layers) were stacked and pressure-bonded to obtain a green chip having 4 layers of the sheet printed with the paste for internal electrode.

Then, the green chip was cut into a predetermined size. After binder removal, the green chip was fired and annealed to obtain a multilayer ceramic fired compact. The binder removal was conducted by heating at a heating rate of 15° C./h to 280° C. and maintaining the temperature for 8 hours in an air atmosphere. The firing was conducted by heating at a heating rate of 200° C./h to 1270 to 1320° C. and maintaining the temperature range for 2 hours and then cooling at a cooling rate of 300° C./h, in a moisturized gas mixture of $N_2$ and $H_2$ atmosphere (oxygen partial pressure: 10.11 atm). The annealing was conducted by maintaining the temperature at 900° C. for 9 hours and then cooling at a cooling rate of 300° C./h, in a moisturized $N_2$ gas atmosphere (oxygen partial pressure: $10^{-7}$ atm). In the moisturizing of the atmospheric gas for the firing, a wetter with a water temperature of 20° C. was used, and in the moisturizing of the atmospheric gas for the annealing, a wetter with a water temperature of 30° C. was used.

Then, end faces of the multilayer ceramic fired compact were polished by sandblasting. The paste for external electrodes was transferred onto the end faces and fired at 800° C. for 10 minutes in a moisturized gas mixture of $N_2$ and $H_2$ to form external electrodes. Thus, a multilayer ceramic capacitor sample was produced.

By the same manner, multilayer ceramic capacitor samples including dielectric layers composed of dielectric particles having average particle diameters shown in Table 1 were produced. In the present application, each average particle diameter of dielectric particles was the average calculated from particle diameter data of a large number of particles (for example, 300 particles), wherein the particle diameter was a length obtained by multiplying a chord length determined by a chord method by 1.5 times. The (D100-D50) value of the dielectric particles was the difference between a maximum particle diameter (D100) and an average particle diameter (D50) of 300 crystal particles. These values were determined from cumulative frequency distribution of circle-equivalent diameters of the crystal particles. The cumulative frequency distribution was obtained by calculating the circle-equivalent diameters of the 300 crystal particles by image processing of a scanning electron microscope (SEM) photograph of a cross section in the direction of thickness of the multilayer ceramic fired compact. The cross section was prepared by polishing the multilayer ceramic fired compact, and subjecting the cross section to chemical etching or thermal etching so that the crystal particles can be observed. In this Example, the average particle diameter and the (D100-D50) value of the dielectric particles were determined on the basis of the particle diameters data of 300 crystal particles, but the number of particles is not limited to this and may be other than 300.

The resulting samples each had a size of 3.2 mm×1.6 mm×0.6 mm. Four dielectric layers were each disposed between internal electrode layers. Each of the dielectric layers has a thickness of 3.5 μm and each of the internal electrode layers has a thickness of 1.0 μm. The resulting multilayer ceramic capacitor samples were not reduced by firing in a reducing atmosphere. In addition, the degree of oxidation of nickel used for the internal electrodes was so low as not to cause IR defect.

(Characteristics Evaluation Methods and Results)

The produced multilayer ceramic capacitor samples were evaluated for capacitance-temperature characteristics, characteristics of the amount of change over time in capacitance, Tc bias characteristics, and average lifetime.

(i) The capacitance-temperature characteristics were evaluated by measuring percentage changes (%) in the electrostatic capacity at a temperature condition of 150° C. which was the temperature that the capacitance-temperature characteristics were deteriorated at the most extent in the temperature range of −50 to 150° C. The electrostatic capacity was measured by using an LCR meter under conditions of a frequency of 1 kHz and an input signal level of 1 Vrms. The results were evaluated whether or not the X8R characteristic (ΔC is within ±15% at −55 to 150° C.) was satisfied. Samples satisfying the characteristic were represented by ○ and samples not satisfying the characteristic were represented by X. Table 1 and FIG. 3 show the results.

Figure 3:
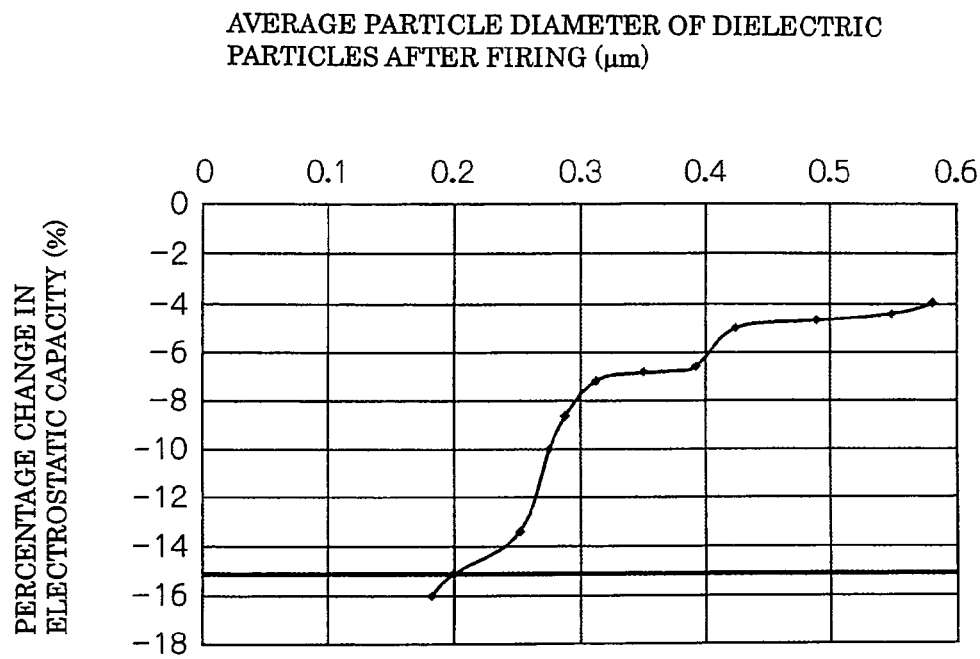
FIG. 3 is a graph showing a relationship between the average particle diameter of dielectric particles (dielectric particles after sintering) constituting the dielectric layers and the capacitance-temperature characteristics (percentage change in the electrostatic capacity).

As it was clear from the results shown in Table 1 and FIG. 3, when the average particle diameter of the dielectric particles (dielectric particles after sintering) was within the range of 0.20 to 0.582 μm, the percentage change in the electrostatic capacity was within 15%; thus, it was confirmed that the X8R characteristic was satisfied.

Figure 4:
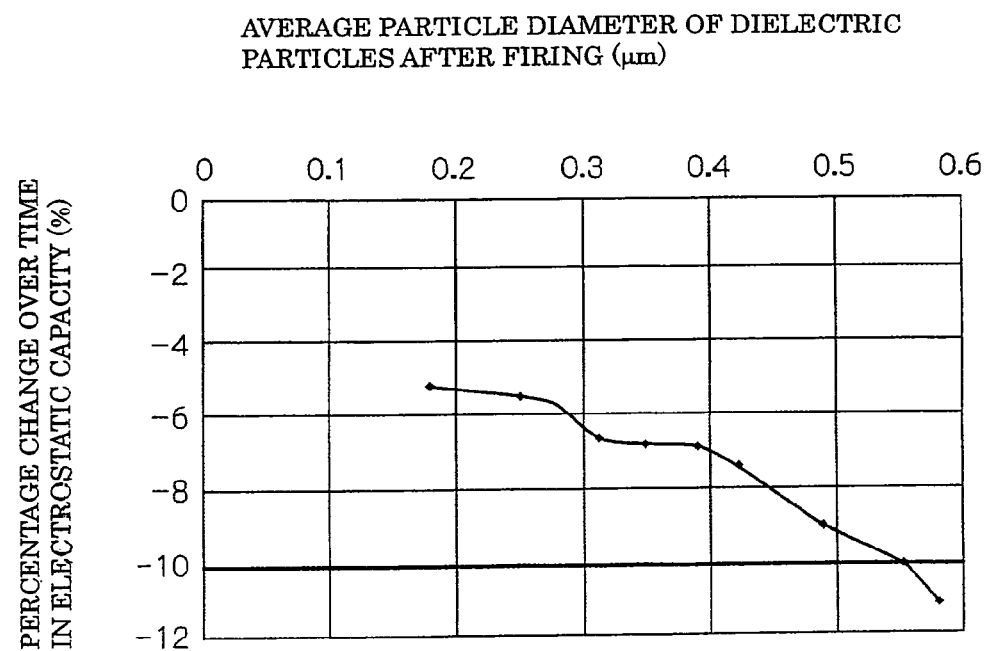
FIG. 4 is a graph showing a relationship between the average particle diameter of dielectric particles (dielectric particles after sintering) constituting the dielectric layers and characteristics of the amount of change over time in capacitance (percentage change in the electrostatic capacity).

(ii) The characteristics of the amount of change over time in capacitance were evaluated for each capacitor samples by measuring the percentage change (%) in the electrostatic capacity before and after applying a direct-current voltage of 7.0 V/μm for 1000 hours at a temperature condition of 85° C. The electrostatic capacities of samples before and after the application of the direct-current voltage for 1000 hours were measured by using an LCR meter under conditions of a frequency of 1 kHz and an input signal level of 1 Vrms. Table 1 and FIG. 4 show the results. The results were evaluated whether or not the percentage change in the electrostatic capacity before and after the application of the direct-current voltage for 1000 hours was within 10%.

As it was clear from the results shown in Table 1 and FIG. 4, it was confirmed that when the average particle diameter of the dielectric particles (dielectric particles after sintering) was within the range of 0.18 to 0.55 μm, the percentage change (before and after 1000 hours) in the capacitance was within 10%.

(iii) The Tc bias characteristics were evaluated by measuring percentage changes (%) in the electrostatic capacity when the resulting capacitor samples were applied with a direct-current voltage of 7.0 V/μm at temperature conditions of −55 to +150° C. The electrostatic capacities were measured by using an LCR meter under conditions of a frequency of 1 kHz and an input signal level of 1 Vrms. The results were evaluated whether or not the percentage change in the electrostatic capacity was within 40%.

Figure 5:
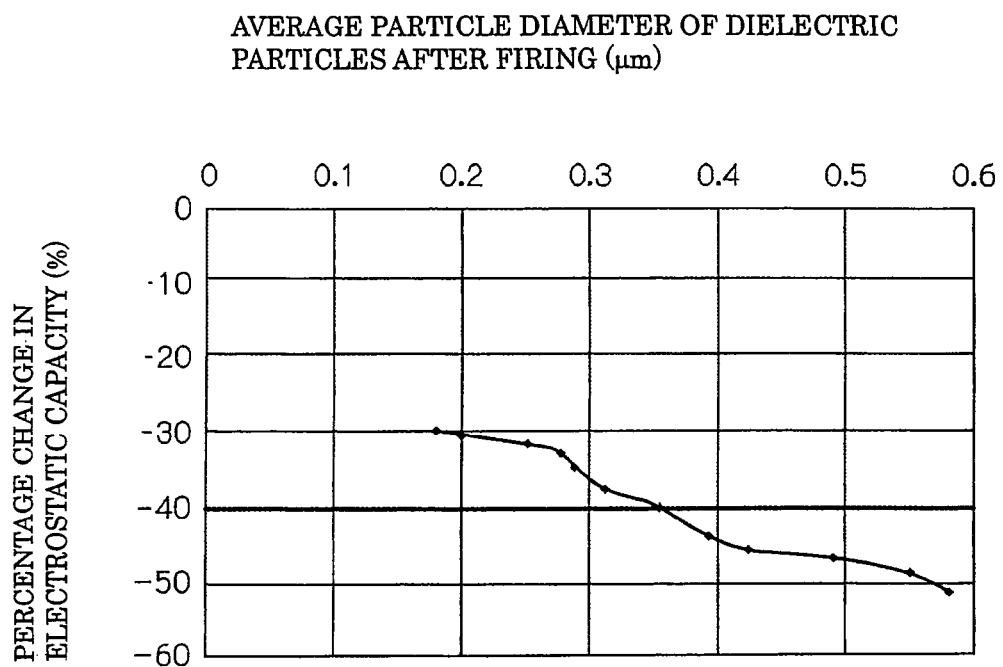
FIG. 5 is a graph showing a relationship between the average particle diameter of dielectric particles (dielectric particles after sintering) constituting the dielectric layers and the Tc bias characteristics (percentage change in the electrostatic capacity).
Figure 6:
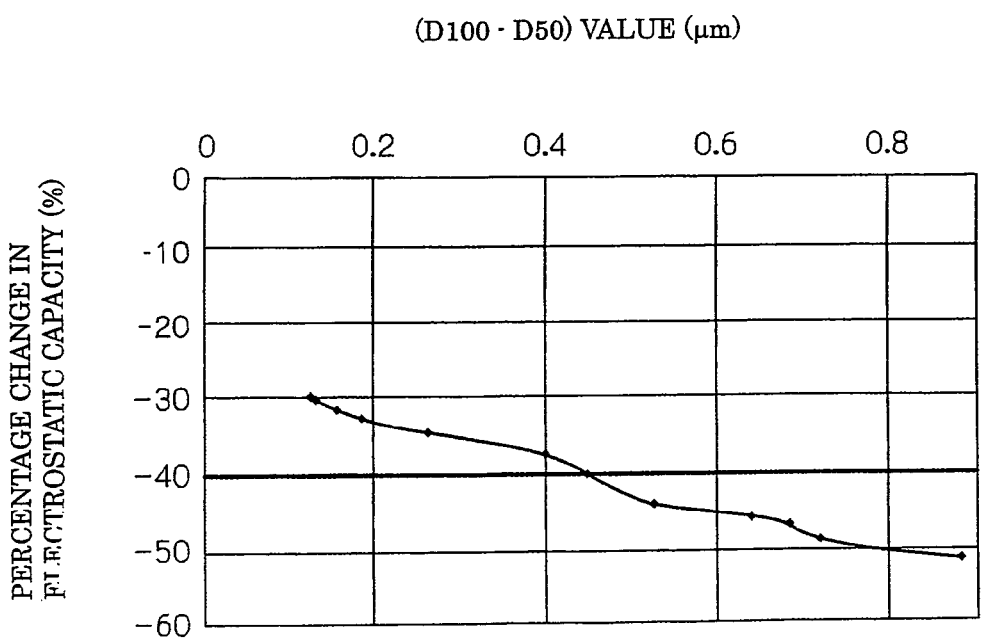
FIG. 6 is a graph showing a relationship between the (D100-D50) value of dielectric particles (dielectric particles after sintering) constituting the dielectric layers and the Tc bias characteristics (percentage change in the electrostatic capacity).

As it was clear from the results shown in Table 1 and FIG. 5, it was confirmed that when the average particle diameter of the dielectric particles (dielectric particles after sintering) was within the range of 0.18 to 0.38 μm, the percentage change in the capacitance was within 40%. Relationship of Tc bias characteristics with (D100-D50) values was investigated. FIG. 6 shows the results. As it was clear from the results shown in FIG. 6, it was confirmed that when the (D100-D50) value was 0.4 μm or less, the percentage change in the capacitance was within 40%.

These results show that a capacitor has excellent Tc bias characteristics when the dielectric particles have a smaller particle size and the particle size distribution is narrower. This may be based on that the ferroelectricity is decreased by constituting the dielectric material with dielectric particles having a smaller size and a narrower size distribution.

(iv) The average lifetime was evaluated by an accelerated test. In the accelerated test, a direct-current voltage of 15.0 V/μm was applied to each of the 12 capacitor samples at a temperature condition of 200° C., and the length of time before the resistance changed by a one-digit magnitude was determined. The average lifetime (average lifetime hours) was evaluated on the basis of the average of the length of the time. The resistance values were calculated using leakage current from the capacitor. When the average lifetime obtained by the accelerated test was 1.5 hours or more, the multilayer ceramic capacitor was evaluated to have sufficient reliability.

Figure 7:
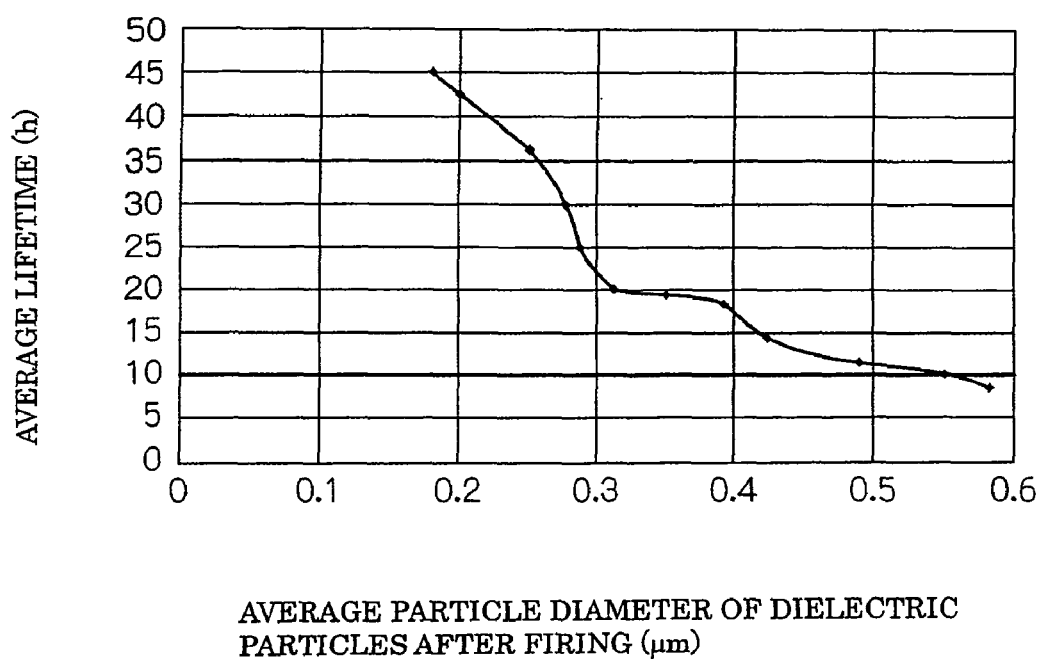
FIG. 7 is a graph showing a relationship between the average particle diameter of dielectric particles (dielectric particles after sintering) constituting the dielectric layers and the average lifetime (average lifetime hours).

As it was clear from the results shown in Table 1 and FIG. 7, every samples obtained in this Example had an average lifetime of 1.5 hours or more and therefore had sufficient reliability as multilayer ceramic capacitors.

TABLE 1

| No. | Specific Surface Area of BaTiO₃ Particles | Firing Temperature (°C.) | Average Particle Diameter of Dielectric Particles (μm) | (D100-D50) value (μm) | Capacitance-temperature Characteristics Percentage Change (%) | X8R | Percentage Change with Time (%) | Percentage Change in Tc Bias Characteristics (%) | Average Lifetime (h) |
|---|---|---|---|---|---|---|---|---|---|
| 1 | 2.7 | 1320 | 0.582 | 0.880 | −4.0 | ◯ | −11.1 | −51.7 | 8 |
| 2 | 3.5 | 1300 | 0.550 | 0.720 | −4.5 | ◯ | −10.0 | −49.0 | 10 |
| 3 | 3.8 | 1300 | 0.490 | 0.680 | −4.7 | ◯ | −9.0 | −47.0 | 11 |
| 4 | 4.1 | 1300 | 0.424 | 0.640 | −5.0 | ◯ | −7.5 | −46.0 | 14 |
| 5 | 4.4 | 1300 | 0.392 | 0.520 | −6.7 | ◯ | −7.0 | −44.0 | 18 |
| 6 | 4.8 | 1300 | 0.350 | 0.440 | −6.9 | ◯ | −6.9 | −40.0 | 19 |
| 7 | 5.0 | 1300 | 0.312 | 0.400 | −7.2 | ◯ | −6.7 | −37.9 | 20 |
| 8 | 5.4 | 1300 | 0.287 | 0.260 | −8.9 | ◯ | −6.0 | −35.0 | 25 |
| 9 | 6.0 | 1300 | 0.276 | 0.180 | −10.0 | ◯ | −5.8 | −33.0 | 30 |
| 10 | 7.0 | 1280 | 0.250 | 0.156 | −13.5 | ◯ | −5.6 | −32.0 | 36 |
| 11 | 7.7 | 1280 | 0.200 | 0.124 | −15.0 | ◯ | −5.4 | −30.5 | 42 |
| 12 | 8.5 | 1270 | 0.180 | 0.120 | −16.0 | X | −5.3 | −30.0 | 45 |

Note:
BCG is an abbreviation for $(Ba_{0.6}Ca_{0.4})SiO_3$ which is the second accessory constituent serving as a firing assistant.

(v) As it was clear from the above-evaluated results of each characteristic of samples having different average particle diameters of dielectric particles constituting the dielectric layers, when the average particle diameter of the dielectric particles (dielectric particles after sintering) was in the range of 0.20 to 0.55 μm, the X8R characteristic was satisfied and the amount of change over time in capacitance was within 10%. In addition, when the average particle diameter of the dielectric particles (dielectric particles after sintering) was in the range of 0.20 to 0.35 μm, the X8R characteristic was satisfied, the amount of change over time in capacitance was within 10%, and the percentage change in capacitance under Tc bias was within 40%. Furthermore, when the (D100-D50) value of the dielectric particles (dielectric particles after sintering) constituting the dielectric layers was 0.4 μm or less, the percentage change in capacitance under Tc bias was within 40%.

INDUSTRIAL APPLICABILITY

In the multilayer ceramic capacitor according to the present invention, the capacitance-temperature characteristics satisfy the X8R characteristic (ΔC/C is within ±15% at −55 to 150° C.) specified by the EIA standard, the amount of change over time in capacitance is small, and the Tc bias characteristics are excellent. Therefore, the multilayer ceramic capacitor can be used in general electronic devices and, in particular, can be suitably used in various electronic devices installed in automobiles used under strict conditions.

The invention claimed is:

1. A multilayer ceramic capacitor comprising a laminate comprising alternately stacked dielectric layers of a sintered compact comprising crystal particles of a dielectric porcelain composite and internal-electrode layers, wherein the dielectric porcelain composite at least comprises
  a primary constituent comprising barium titanate;
  a first accessory constituent comprising at least one oxide selected from the group consisting of magnesium oxide (MgO), calcium oxide (CaO), barium oxide (BaO), and strontium oxide (SrO);
  a second accessory constituent comprising silicon oxide as a major constituent;
  a third accessory constituent comprising at least one oxide selected from the group consisting of vanadium oxide ($V_2O_5$), molybdenum oxide ($MoO_3$), and tungsten oxide ($WO_3$);
  a fourth accessory constituent comprising an oxide of R1, wherein R1 is at least one selected from the group consisting of Sc, Er, Tm, Yb, and Lu;
  a fifth accessory constituent comprising $CaZrO_3$ or a combination of CaO and $ZrO_2$; and
  a sixth accessory constituent comprising an oxide of R2 wherein R2 is at least one selected from the group consisting of Y, Dy, Ho, Tb, Gd, and Eu;
  wherein, in the case of 100 moles of barium titanate, there are 0.1 to 3 moles of the first accessory constituent, 2 to 10 moles of the second accessory constituent, 0.01 to 0.5 moles of the third accessory constituent, 0.5 to 7 moles of the fourth accessory constituent, wherein the number of moles of the fourth accessory constituent is that of R1 alone, more than 0 but not more than 5 moles of the fifth accessory constituent, and more than 0 but not more than 9 moles of the sixth accessory constituent; and
  the crystal particles of the dielectric layers have an average particle diameter (D50) and a maximum particle diameter (D100), wherein the average particle diameter (D50) is not less than 0.2 μm and less than or equal to 0.55 μm, and the difference (D100-D50) between the maximum particle diameter (D100) and the average particle diameter (D50) of the crystal particles of the dielectric layers is 0.4 μm or less, and
  wherein a percentage change in the electrostatic capacity before and after aging is within 10%.

2. The multilayer ceramic capacitor according to claim 1, wherein the dielectric porcelain composite further comprises a seventh accessory constituent comprising manganese oxide (MnO) or chromium oxide ($Cr_2O_3$) and in the case of 100 moles of barium titanate, there are 0.01 to 0.5 moles of the seventh accessory constituent.

3. The multilayer ceramic capacitor according to claim 2, wherein the average particle diameter of the crystal particles of the dielectric layers is in the range of not less than 0.2 μm and less than or equal to 0.35 μm.

4. The multilayer ceramic capacitor according to claim 1, wherein the average particle diameter of the crystal particles of the dielectric layers is in the range of not less than 0.2 μm and less than or equal to 0.35 μm.

5. The multilayer ceramic capacitor according to claim 1, wherein the alternately stacked dielectric layers of a sintered compact consists essentially of the crystal particles of a dielectric porcelain composite and internal-electrode layers.

6. The multilayer ceramic capacitor according to claim 1, wherein the first accessory constituent consists essentially of at least one oxide selected from the group consisting of magnesium oxide (MgO), calcium oxide (CaO), barium oxide (BaO), and strontium oxide (SrO).

7. The multilayer ceramic capacitor according to claim 1, wherein the third accessory constituent consists essentially of at least one oxide selected from the group consisting of vanadium oxide ($V_2O_5$), molybdenum oxide ($MoO_3$), and tungsten oxide ($WO_3$).

8. The multilayer ceramic capacitor according to claim 1, wherein the fourth accessory constituent consists essentially of an oxide of R1, wherein R1 is at least one selected from the group consisting of Sc, Er, Tm, Yb, and Lu.

9. The multilayer ceramic capacitor according to claim 1, wherein the fifth accessory constituent consists essentially of $CaZrO_3$ or a combination of CaO and $ZrO_2$.

10. The multilayer ceramic capacitor according to claim 1, wherein the sixth accessory constituent consists essentially of an oxide of R2 wherein R2 is at least one selected from the group consisting of Y, Dy, Ho, Tb, Gd, and Eu.

11. The multilayer ceramic capacitor according to claim 1, wherein the second accessory constituent comprises silicon oxide and at least one selected from the group consisting of MO, lithium oxide and boric oxide, wherein M is at least one element selected from the group consisting of Ba, Ca, Sr, and Mg.

12. The multilayer ceramic capacitor according to claim 1, wherein the second accessory constituent is represented by $(BaCa)SiO_{2+x}$, wherein x is 0.7 to 1.2.

13. The multilayer ceramic capacitor according to claim 12, wherein x is 0.8 to 1.1.

14. The multilayer ceramic capacitor according to claim 1, wherein in the fifth accessory constituent, the molar ratio of Ca to Zr is 0.5 to 1.5.

15. The multilayer ceramic capacitor according to claim 1, wherein the sixth accessory constituent consists essentially of an oxide of Y.

16. The multilayer ceramic capacitor according to claim 1, wherein the total content of the fourth and sixth accessory constituents for 100 moles of barium titanate is preferably 13 moles or less.

17. The multilayer ceramic capacitor according to claim 1, further comprising a seventh accessory constituent comprising manganese oxide (MnO) or chromium oxide ($Cr_2O_3$).

18. The multilayer ceramic capacitor according to claim 1, wherein the conditions under which the percentage change in the electrostatic capacity before and after aging is calculated by applying a direct-current voltage of 7 V/μm for 1000 hours to the multilayer ceramic capacitor in a temperature environment of 85°.

* * * * *